United States Patent

Weber et al.

[11] Patent Number: 6,060,012
[45] Date of Patent: May 9, 2000

[54] METHOD FOR BLOW-MOLDING AND RELEASING HOLLOW ARTICLES

[75] Inventors: Lawrence H. Weber, Ypsilanti; David M. Johnson, Saline, both of Mich.

[73] Assignee: R & B Machine Tool Company, Saline, Mich.

[21] Appl. No.: 09/007,644

[22] Filed: Jan. 15, 1998

Related U.S. Application Data

[60] Division of application No. 08/664,439, Jun. 18, 1996, Pat. No. 5,759,593, which is a continuation-in-part of application No. 08/567,778, Dec. 5, 1995, Pat. No. 5,665,404.

[51] Int. Cl.[7] .................................................. B29C 49/70
[52] U.S. Cl. ......................... 264/334; 264/543; 425/537
[58] Field of Search .................................. 264/334, 538, 264/543; 425/532, 533, 540, 537

[56] References Cited

U.S. PATENT DOCUMENTS

| | | | |
|---|---|---|---|
| 3,780,492 | 12/1973 | Corderoy | 53/247 |
| 3,941,863 | 3/1976 | Pollock et al. | 264/543 |
| 3,945,486 | 3/1976 | Cooper | 198/179 |
| 4,421,472 | 12/1983 | Martin, Jr. | 425/532 |
| 4,439,394 | 3/1984 | Appleyard | 264/538 |
| 4,902,217 | 2/1990 | Martin et al. | 264/543 |

FOREIGN PATENT DOCUMENTS

| | | | |
|---|---|---|---|
| 2825859 | 1/1979 | Germany | 264/538 |

*Primary Examiner*—Catherine Timm
*Attorney, Agent, or Firm*—Reising, Ethington, Barnes, Kisselle, Learman & McCulloch, P.C.

[57] ABSTRACT

A method and an apparatus are provided for blow-molding hollow articles. The blow-molding apparatus includes a carrousel mounted to rotate within a support frame. The carrousel carries four molds around a circular mold path. Two blow-molding work stations are disposed next to the mold path in fixed positions relative to the frame. The carrousel is indexed to cause each mold to pause by each work station one time during each carrousel revolution. The molds pause by each work station to allow blow-molding operations to be performed in conjunction with each mold at each work station. At one blow-molding work station, located at the 12:00 position of the mold path, an extruder injects parison into each mold. At the other work station, located in the 9:00 position of the mold path, a take-out mechanism extracts blow molded articles from the molds and places them upright on a conveyor. The take-out mechanism includes an oscillator arm that is rotated ninety degrees at a time between a horizontal article engagement position and a vertical article release position. A take-out member extends from the oscillator arm and includes expandable pins that extend into the molds to grip the blow-molded articles at their necks.

16 Claims, 6 Drawing Sheets

METHOD FOR BLOW-MOLDING AND RELEASING HOLLOW ARTICLES

This is a divisional of Application Ser. No. 08/664,439, filed Jun. 18, 1996 now U.S. Pat. No. 5,759,593, which is a continuation-in-part of Application Ser. No. 08/567,778 filed Dec. 5, 1995 now U.S. Pat. No. 5,665,404.

TECHNICAL FIELD

This invention relates generally to blow molding and, more particularly, to blow molding hollow articles using an apparatus with a plurality of molds mounted on a rotary carrousel.

BACKGROUND OF THE INVENTION

Current blow-molding machinery is designed to manufacture hollow plastic containers by extruding a parison between opposed, parted mold halves. The mold is then closed and air is injected into the parison, blowing and distending it outward so that it conforms itself to the inner contours of the mold which match the outer shape of the bottle to be produced. The newly-formed container is allowed to harden, then is extracted or dropped from the mold.

Some plastic bottle manufacturers produce blow-molded articles by using rotary blow-molding machines. A typical rotary blow-molding machine includes a rotating carrousel that carries two or more mold stations around a circular mold station path. Each mold station includes a mold with a mold cavity. The carrousel is indexed to hold each mold station momentarily motionless at each of a series of blow molding "work stations". A "work station" is a position where each mold station must pause in its circular path for a particular operation to be carried out. A "work station series" is a progression of work stations necessary to complete a blow molding process on a single mold station in a single carrousel revolution. Blow molding operations are carried out sequentially on each mold as each mold station rotates through a work station series, pausing momentarily at each work station in the series.

Rotary blow-molding machines may, of course, include any number of mold and work stations, and may include more than one work station series arranged around a single mold station path.

The final work station in a work station series is the article take-out mechanism where the blown articles are released or extracted from their respective molds. These article take-out mechanisms can operate to remove articles while the mold is paused at the work station or during continuous rotation of the mold past the work station.

An example of the latter of those two types of take-out mechanisms is shown in U.S. Pat. No. 4,902,217 to Martin et al. which discloses a rotary take-out mechanism with an oscillating turret arm mounted adjacent a rotary mold carrousel at an article take-out work station. One end of the turret arm is pivotally mounted to a carrousel axle. The other end of the turret arm, i.e., the "outer" end, extends radially outward from the carrousel axis beyond the carrousel outer diameter. A take-out member is mounted on the turret arm outer end. As the molds revolve around the carrousel axle, the turret arm repeatedly swings the take-out member upward and downward through a small arcuate path just outside the circular path of the molds as the molds pass the take-out work station. The downward swing of the turret arm matches the movement of the orbiting molds thus canceling relative motion between the molds and the take-out member over a small arcuate distance. This temporary lack of relative motion provides enough time for the take-out member to engage and extract blown articles from the molds as they pass through the take-out work station.

The take-out member of the Martin et al. patent comprises four article-engagement members mounted at spaced locations around the circumference of a wheel. The wheel is rotatably mounted at the turret arm outer end on an axis parallel to that of the carrousel axis. The wheel is synchronized to rotate in an angular direction opposite that of the carrousel. As each article-engagement member rotates past a carrousel mold it engages a blown article, removes it from its mold, rotates it downward and away from the carrousel, and places it in an upright position on an article-conveyor mechanism.

Take-out mechanisms of the type disclosed in the Martin et al. patent are inherently complex as they must synchronize with and track the continuous arcuate motion of the molds as the molds pass an article take-out work station. What is needed is a simplified article take-out mechanism designed to remove blown articles from an indexing-type blow-molding apparatus that momentarily holds each mold stationary at an article take-out work station.

SUMMARY OF THE INVENTION

The present invention provides a rotary blow molding apparatus with a take-out mechanism that includes an oscillator arm supported adjacent the carrousel. An oscillator is operatively connected to the oscillator arm to alternately drive the oscillator arm between an article-engagement position and an article-release position. An article take-out member is supported on the oscillator arm. The take-out member releasably grips and removes blow-molded articles from the molds at the article take-out work station when the arm is in the article-engagement position.

According to one aspect of the present invention, the oscillator axis is spaced from the carrousel axis to allow the oscillator arm to swing engaged articles away from the carrousel of an indexing-type rotary blow molding machine and to allow the take-out member to release the blow-molded articles in an upright position.

According to another aspect of the present invention, the central carrousel axis and the oscillator axis are parallel and are disposed horizontally.

According to another aspect of the present invention the blow molding apparatus includes a counter-weight system connected to the oscillator arm. The counter-weight system may be an air counter-weight system comprising an air cylinder connected between the support frame and the oscillator arm.

According to another aspect of the present invention, the article-engagement member includes an article-gripper. The article gripper may comprise an expandable pin with a resilient sleeve and a fluid piston. In addition, the take-out member may include more than one article-gripper.

According to another aspect of the present invention the take-out member includes a carriage reciprocally mounted on the oscillator arm between the article-gripper and the oscillator axis. The take-out member may also include a carriage actuator having a main body fixed to the oscillator arm and an actuator shaft connected to the carriage. The carriage actuator may comprise an air cylinder. The article grippers may be connected to and carried on the carriage.

According to another aspect of the present invention, the take-out member includes first and second energy absorbing units fixed to the oscillator arm. The energy absorbing units may comprise fluid pistons.

According to still another aspect of the present invention an encoder is disposed adjacent the carrousel and provides operating signals to synchronize the carriage actuator with carrousel rotation.

The invention also contemplates a method for removing a blown article from a mold station on an indexed rotary carrousel while the mold station is held momentarily stationary at an article take-out work station.

An article take-out mechanisms constructed according to the present invention can extract blow-molded articles from indexing-type rotary blow molding machines without the complicated mechanisms required to cancel motion between take-out mechanism and the orbiting molds in non-indexed blow molding machines.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
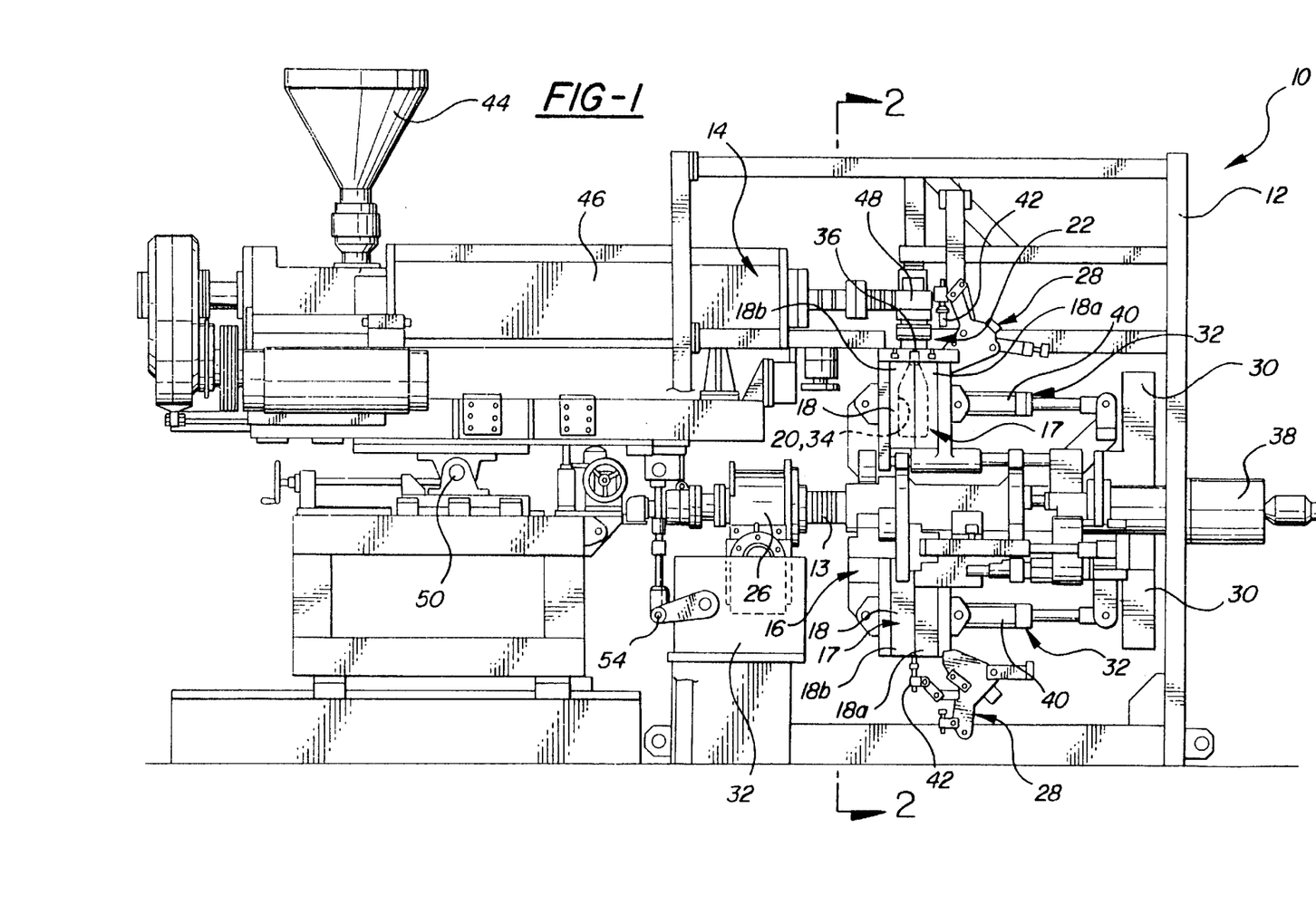
FIG. 1 is a front view of a rotary blow molding apparatus constructed in accordance with the present invention.
Figure 2:
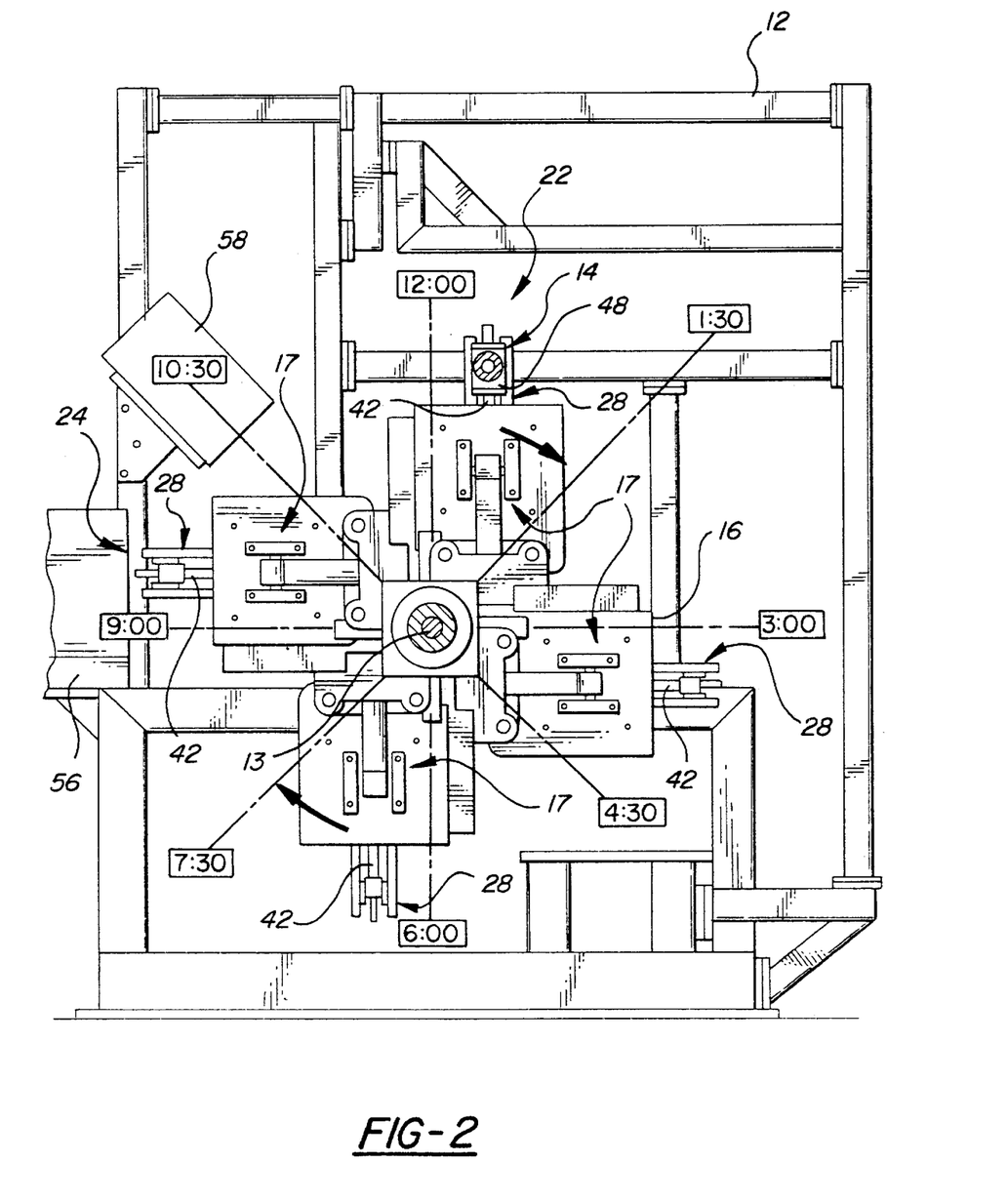
FIG. 2 is a cross-sectional end view taken along line 2—2 of FIG. 1.

A rotary blow-molding apparatus of the type for blow-molding hollow articles is generally shown at 10 in FIG. 1. The blow-molding apparatus includes a support frame 12, a parison extruder 14 and a carrousel 16. The carrousel 16, as shown in FIGS. 1 and 2, carries four mold stations 17 and is supported on the frame 12 along axle 13 to rotate about a central carrousel axis. The carrousel axle 13 is coaxially disposed along the carrousel axis. The four mold stations 17 are supported on and rotate with the carrousel 16 around a circular mold station path. Each mold station 17 includes one mold 18. The extruder 14 is supported on the frame 12 and extrudes parison into each mold 18 at each mold station 17. As is best shown in FIG. 1, each mold 18 includes a mold cavity 20 adapted to receive the parison and form the exterior shape of the article during blow molding.

As is best shown in FIG. 2, two work stations 22, 24 are disposed adjacent the mold station path in fixed positions relative to the frame 12, i.e., the 12:00 and the 9:00 positions relative to the mold station path, respectively. As shown in FIG. 1, an indexer 26 is operatively connected to the carrousel 16 and is adapted to momentarily halt the carrousel 16 in a number of indexing positions. The indexing positions and work stations 22, 24 are angularly spaced to cause each of the mold stations 17 to momentarily halt adjacent each of the work stations 22, 24. The mold stations 17 each halt adjacent each work station 22, 24 to allow blow-molding operations to be performed on the article within each mold 18 at each work station 22, 24.

As shown in FIGS. 1 and 2 the carrousel assembly 16 includes the four mold stations 17 and four blow pin assemblies 28. As shown in FIG. 2, the carrousel assembly 16 also includes hydraulic manifolds 30, and hydraulic press assemblies 32 for opening and closing the molds 18—all supported around the carrousel axle 13 to rotate around the central carrousel axis.

The four mold stations 17 are evenly-spaced around the axle 13. As shown in FIG. 1, each mold 18 includes two mold halves: a front half 18a and a back half 18b. Each mold half 18a, 18b has an inner surface with a hollowed-out portion 34. When the inner surfaces of the two halves are pressed together, the hollowed-out portions 34 join to form the mold cavity 20. The mold cavity 20 defines the exterior shape of the blow-molded articles to be produced.

The mold halves 18a, 18b are slidably mounted opposite one another so that they may be repeatedly slid together and apart during the blow-molding process. When the mold halves 18a, 18b are joined together, a single mold opening 36 remains at the top of the joined mold 18.

The hydraulic press assembly 32 includes an electric hydraulic pump 38 that provides hydraulic pressure through the hydraulic manifolds 30 to four hydraulic rams 40. Each hydraulic ram 40 is connected to the slidably-mounted front half 18a of one of the molds 18. The hydraulic rams 40 open each mold 18 as it passes from the 8:00 to the 9:00 position of the mold station path. The rams 40 close their respective molds 18 as they depart the 12:00 position of the mold station path.

One example of a mold station with hydraulic rams and slidably-mounted mold halves according to the present invention is disclosed in greater detail in U.S. Pat. No. 4,421,472, issued to Martin, Jr., assigned to the assignee of the present invention and incorporated herein by reference.

Each of the four blow-pin assemblies 28 is mounted on one of the four mold stations 17 adjacent the front mold-half 18a of one of the four molds 18 as shown in FIG. 1. In other words, each mold 18 carries its own blow-pin assembly 28. Each of the four blow-pin assemblies 28 supports a blow pin 42.

Each blow pin assembly 28 is adapted to move its respective blow pin 42 vertically in and out of its respective mold opening 36 from a vertical insertion position directly over the mold opening 36. This allows each blow pin assembly 28 to insert its pin 42 into the extruded parison extending into the mold cavity 20 through the mold opening 36, inject air to inflate the parison, then remove the pin 42. Each blow pin assembly 28 inserts its blow pin 42 into its respective mold cavity 20 when its respective mold 18 pauses in the 1:30 position of the mold station path shown in FIG. 2. Each blow pin assembly 28 withdraws its blow pin 42 at the approximate 8:00 position.

Each blow pin assembly 28 is additionally adapted to move its respective blow pin 42 laterally into and away from the vertical-insertion position. Each blow pin assembly 28 moves its pin 42 into the vertical-insertion position prior to lowering the pin 42 vertically into the extruded parison in the mold opening 36. Each blow pin assembly 28 retracts its pin 42 radially-outward and away from the vertical-insertion position to prevent the blow pin 42 from striking the extruder 14 as the mold station 17 that the blow pin 42 is mounted on rotates into the 12:00 position. The blow pin assemblies 28 may be of the type disclosed in U.S. Pat. No. 4,919,607 to Martin et al., assigned to the assignee of the present invention and incorporated herein by reference.

The blow pins 42 receive air from a source of pressurized air. The air is fed in a conventional manner to blow pins 42 using a manifold within axle 13, a pair of rotational pneumatic couplings (not shown) to provide and receive the air from the manifold, and tubes (not shown) to deliver the air to the blow pins. The blow pins 42 are hollow, allowing air to pass through them and into the parison. The injected air expands and stretches the molten parison outwardly until the parison contacts and conforms itself to the inner walls of the mold cavity 20.

The work stations 22, 24 are supported at fixed locations around the mold station path. The work station positions are fixed in relation to the frame 12. Each work station 22, 24 includes structures external to the carrousel 16 that perform operations on the molds 18 or blow-molded articles contained in the molds 18.

The work station 22 at the 12:00 position of the mold station path includes a parison extruder 14. The extruder 14 includes a hopper 44 for receiving parison pellets, a parison heater 46 that heats the pellets until they melt, and, as shown in both FIGS. 1 and 2, an extrusion head 48 that extrudes a molten parison into each of the mold cavities 20. The extrusion head 48 is reciprocally supported on the frame 12 above the mold station path at the mold station path's 12:00 position.

The reciprocal motion is necessary to move the extrusion head 48 out of the mold station path and prevent a collision as each mold station 17 rotates into the 12:00 position . To produce the reciprocal motion, the extruder 14 is mounted on a pivot 50. An extruder lift cam box 52 is operatively connected to the extruder 14 through a mechanical linkage 54, and causes the extruder 14 to rock back and forth on the pivot 50. The distance between the pivot 50 and the extrusion head 48 is great enough so that the rocking motion produces an essentially vertical up-and-down reciprocal motion at the extrusion head 48.

The work station 24 at the 9:00 position of the mold station path, which may be referred to as the article take-out work station 24, includes an article take-out mechanism 56 shown in FIGS. 2–6. The take-out mechanism 56 removes articles from the molds 18 as each mold station 17 halts in the 9:00 position of the mold station path.

Figure 3:
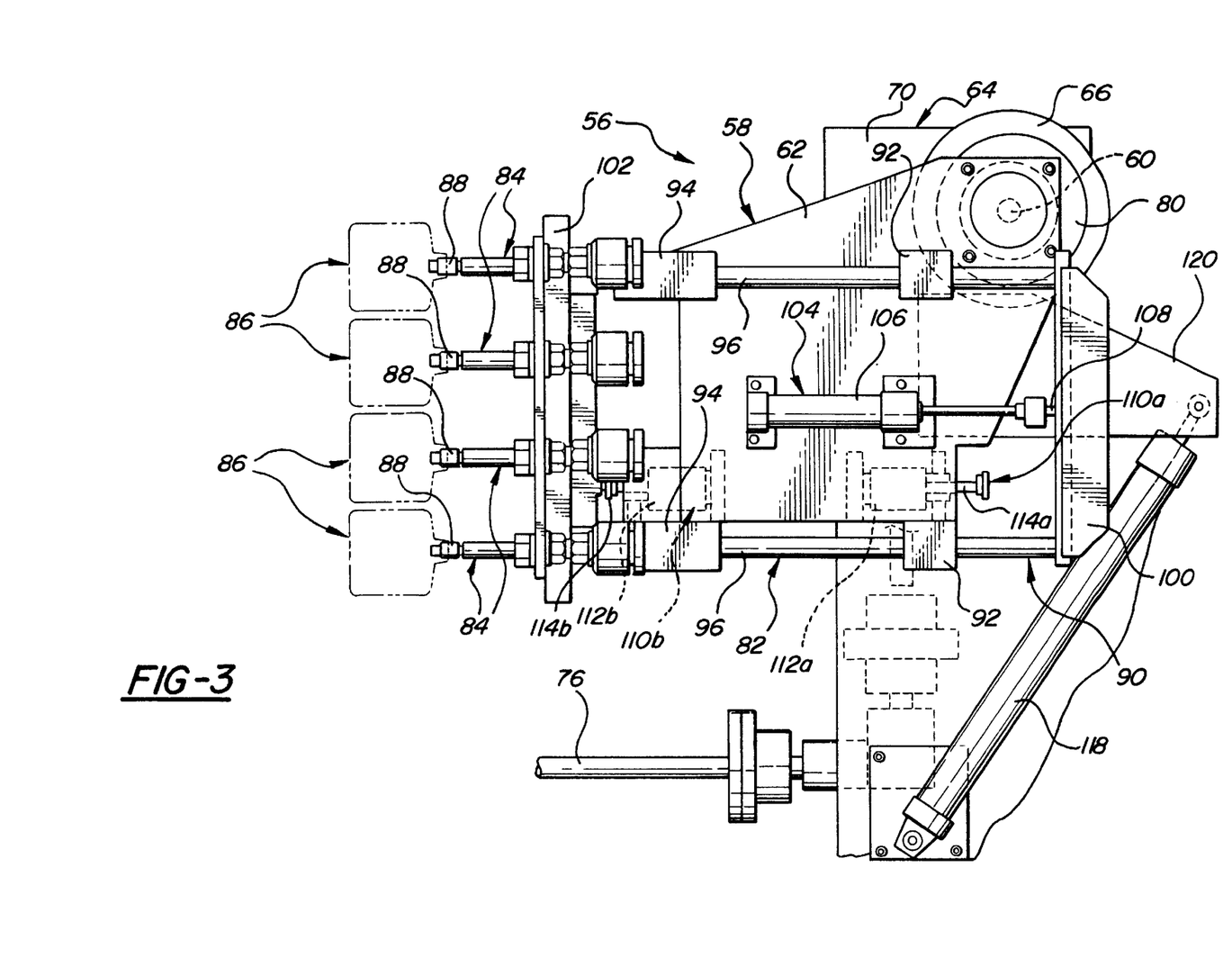
FIG. 3 is a front view of a take-out mechanism constructed in accordance with the present invention and shown in an article-engagement position with pneumatic lines removed for clarity.

The take-out mechanism 56 includes an oscillator arm, generally indicated at 58 in FIGS. 3–6. The oscillator arm 58 is supported adjacent the carrousel 16 for pivotal movement about an oscillator axis 60 between an article-engagement position, as is best shown in FIG. 3, and an article-release position, best shown in FIG. 4. The oscillator arm 58 is formed from a flat steel plate 62 in the shape shown in FIGS. 3 and 4.

Figure 4:
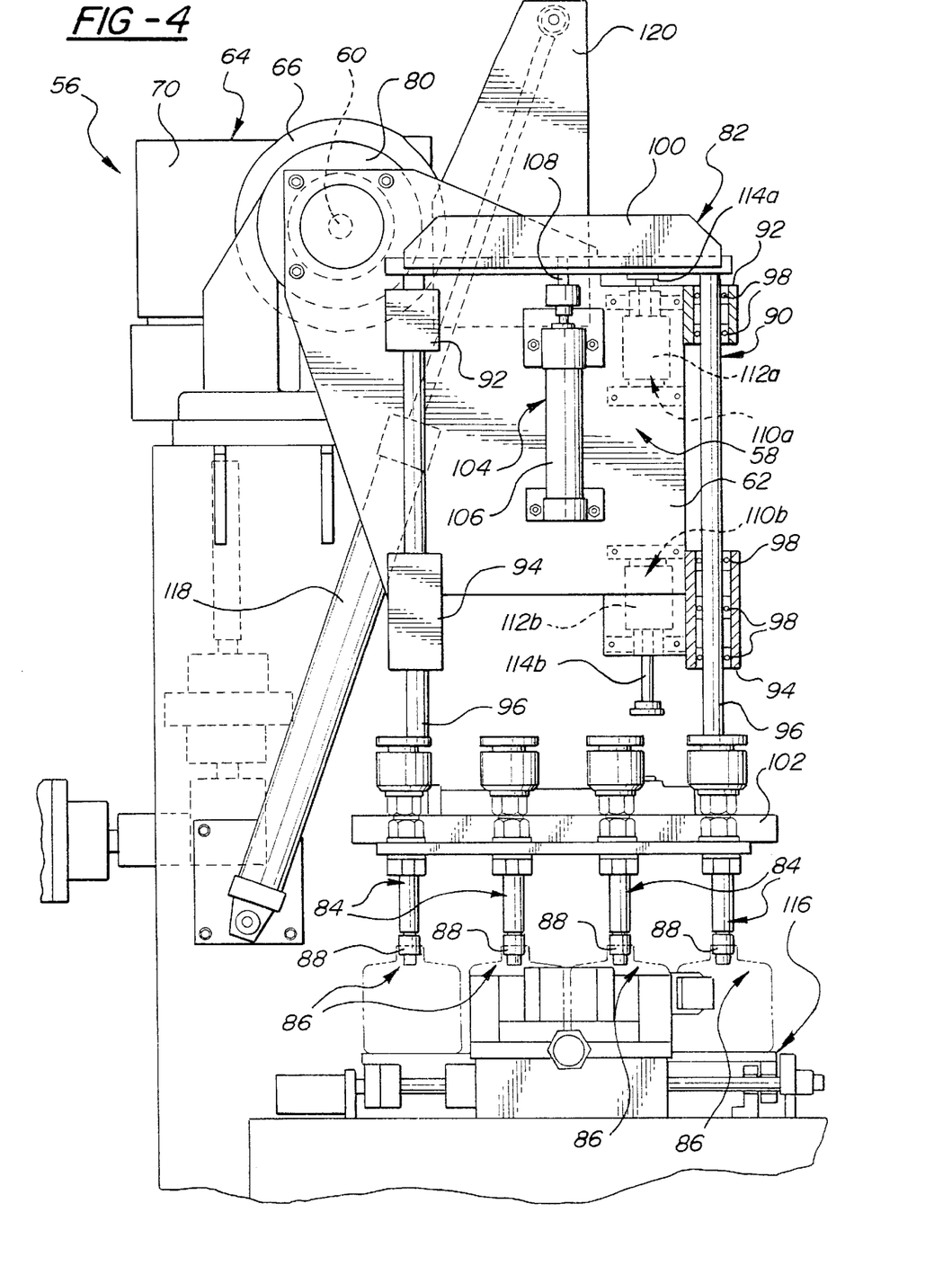
FIG. 4 is a partially cut-away front view of the take-out mechanism of FIG. 3 shown in an article-release position with pneumatic lines removed.
Figure 5:
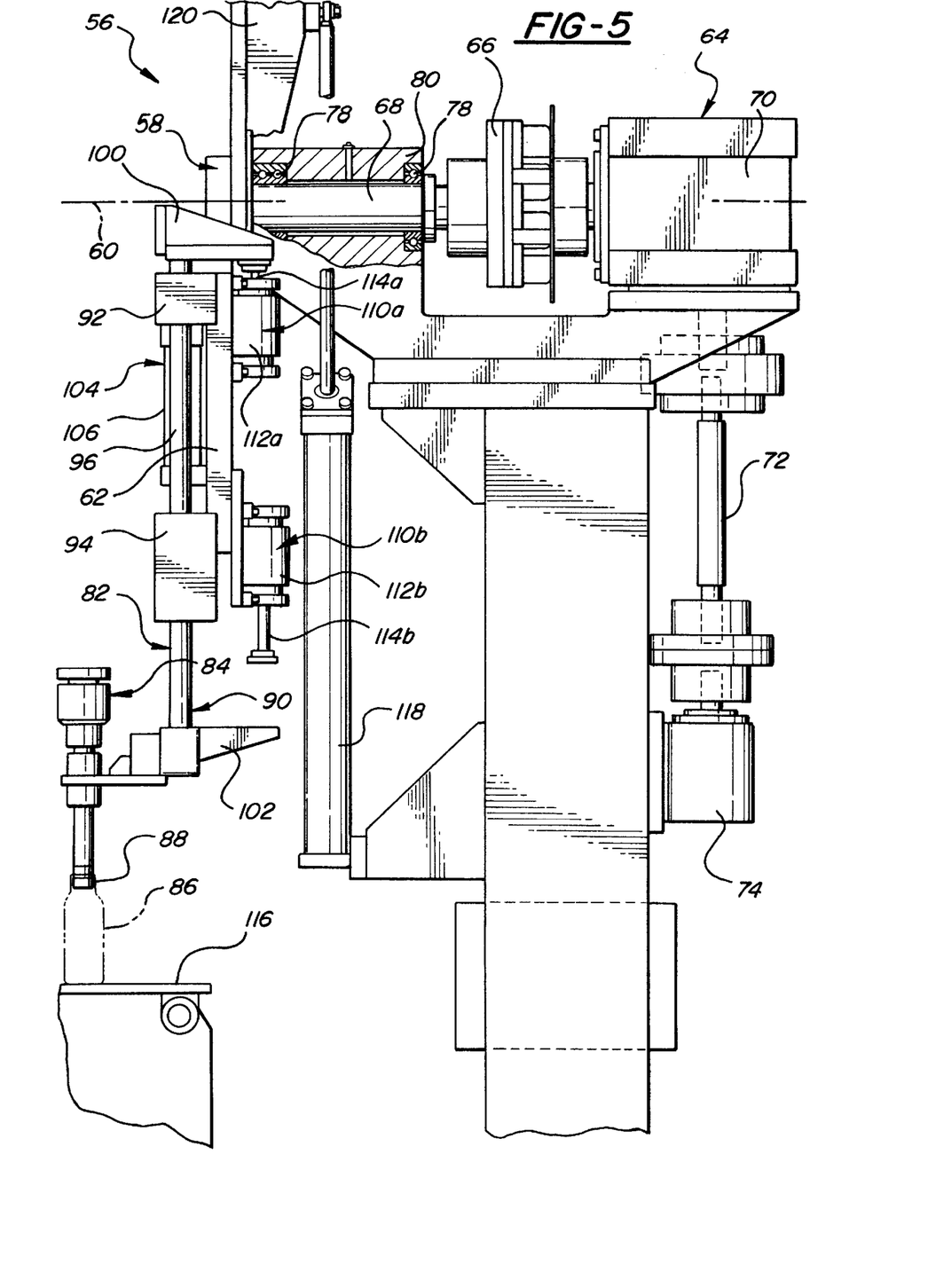
FIG. 5 is a partially cut-away end view of the take-out mechanism of FIG. 4 shown in the article-release position with pneumatic lines removed.
Figure 6:
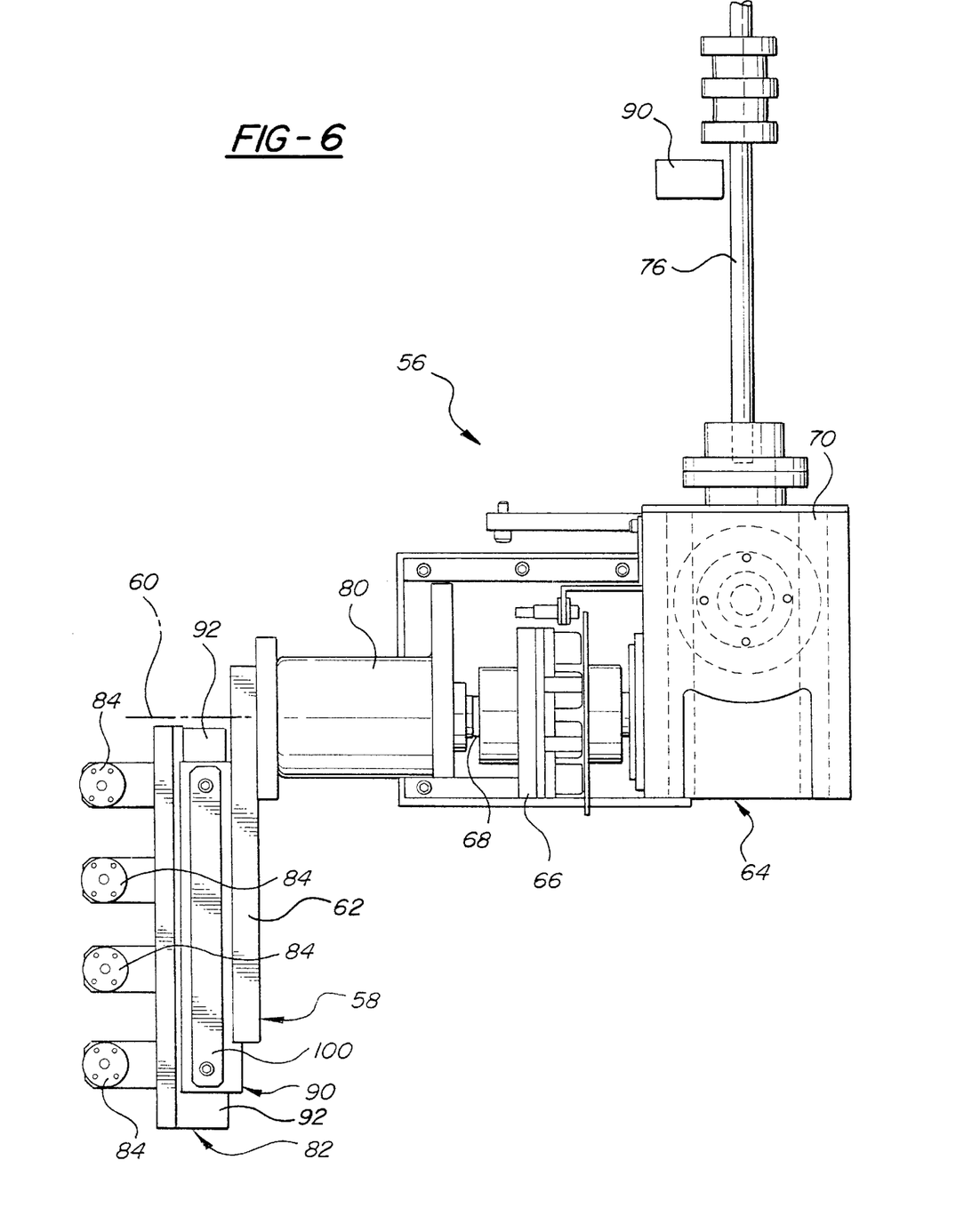
FIG. 6 is a top view of the take-out mechanism of FIG. 4 shown in the article-release position with pneumatic lines and support frame removed.

A well-known and commercially-available oscillator, manufactured by Camco, is generally indicated at 64 in FIGS. 3–6. The oscillator 64 is mounted on the support frame 12 and is operatively connected to the oscillator arm 58 via an output overload clutch 66 and a horizontal output shaft 68. The oscillator 64 alternately drives the oscillator arm 58 between the article-engagement position and an article-release position. The oscillator 64 includes a cam (not shown) located within a generally box-shaped oscillator housing 70. A vertical input shaft 72, shown in FIG. 5, continuously rotates whenever the carrousel 16 is rotating. As is best shown in FIGS. 5 and 6, the input shaft 72 is driven through a differential 74 by the main carrousel drive shaft 76. The input shaft 72 extends upward into the oscillator housing 70 and engages the cam. The cam causes the clutch 66 and output shaft 68 to rotate 90 degrees, dwell, then to rotate 90 degrees back to its original position. As shown in FIG. 5, the output shaft extends through two sets of bearings 78 fixed within a hub assembly 80.

An article take-out member, generally indicated at 82 in FIGS. 3–6, is supported on the oscillator arm 58. The take-out member 82 has five expandable pins 84 disposed in a linear array at a point spaced from the oscillator axis 60 from where they can releasably grip and remove five blown articles 86 from each of the molds 18 when those molds 18 pause at the article take-out work station 24 and when the arm 58 is in the article-engagement position.

To engage blow-molded articles 86, the expandable pins 84 are inserted into the necks of the blow-molded articles 86 and are then axially compressed. The axial compression causes the expandable pins 84 to expand radially within the article necks and to grip the articles 86 by the resultant compressive force exerted against the inner walls of the article necks.

As shown in FIGS. 3–5, the radially expandable portion of each expandable pin 84 is a resilient cuff 88. A fluid piston (not shown) within each expandable pin 84 causes each cuff 88 to radially expand. The radial expansion results when the piston axially compresses the cuff 88 in response to low pressure air directed by control signals from a programmable limit switch (not shown). The limit switch is located in an encoder (not shown) disposed adjacent the main carrousel drive shaft 76. The expandable pins 84 may be constructed, actuated and/or supplied with low-pressure air as described in U.S. Pat. No. 4,902,217 (the '217 patent)—assigned to the assignee of the present invention and incorporated herein by reference.

The article take-out member 82 also includes a carriage, generally indicated at 90 in FIGS. 3–6, that is reciprocally mounted on the oscillator arm 58 between the expandable pins 84 and the oscillator axis 60. An upper 92 and a lower 94 pair of parallel tubular sleeves are fixed to the oscillator arm 58. The carriage 90 includes a pair of parallel cylindrical slide bars 96 slidably disposed within the sleeves 92, 94. As shown in FIG. 4, the bars 96 extend through several sets of bearings 98 coaxially disposed within the sleeves 92, 94. Each of the slide bars 96 has an upper end and a lower end. An upper yoke 100 is fixed to the upper ends of the slide bars 96 and a lower yoke 102 is fixed to the lower ends of the slide bars 96 as is best shown in FIGS. 3 and 4. The two yokes 100, 102 and the two slide bars 96 form a rectangular frame.

As is best shown in FIGS. 3 and 4, the expandable pins 84 extend through a row of four holes (not shown) in the carriage lower yoke 102. The expandable pins 84 are fastened into the holes to form a parallel linear array. The pins 84 are spaced apart along the length of the lower yoke 102 with their expandable cuffs 88 extending downwardly.

The take-out member 82 also includes a carriage actuator, generally indicated at 104 in FIGS. 3–5. The carriage actuator 104 includes a first air cylinder 106 fixed to the oscillator arm 58 with an actuator shaft 108 connected to the carriage upper yoke 100. The carriage actuator 104 drives the carriage 90 between an extended and a retracted position. The extended position is for engaging and releasing blown articles 86 when the oscillator arm 58 is in its article-engagement position and article release position, respectively. The retracted position is for transporting the blown articles 86 between the engagement and release positions.

Pressurized air is supplied to the first air cylinder 106 in a well-known manner from a main feed line through filters, a regulator and an electrical 4-way valve (not shown). The 4-way valve is connected to a programmable limit switch located in the encoder on the main carrousel drive shaft 76 (not shown). Air may be metered and delivered to the first air cylinder 106 as described in the '217 patent and incorporated herein by reference.

The take-out member 82 also includes an upper energy absorbing unit, generally indicated at 110a in FIGS. 3–5. The upper unit 110a is fixed to an upper edge of the oscillator arm 58 between the upper tubular sleeves 92. The upper energy-absorbing unit 110a decelerates the carriage 90 as it reaches its fully extended position. A lower energy absorbing unit, generally indicated at 110b in FIGS. 3–5, is fixed to a lower edge of the oscillator arm 58 between the lower tubular sleeves 94. The lower energy-absorbing unit 110b decelerates the carriage 90 as it reaches its fully retracted position. Energy absorbing units of this type are both well-known and commercially-available. The energy-absorbing units 110a, 110b each comprise fluid cylinders 112a, 112b with pistons (not shown) slidably disposed within the fluid cylinders. In each unit 110a, 110b, a plunger rod 114a, 114b is coaxially disposed within its respective fluid cylinder and is connected at an inner end (not shown) to its respective piston. An outer end of each plunger rod extends outwardly from an opening in one end of its respective fluid cylinder to engage one of the carriage yokes 100, 102. Each fluid cylinder 112a, 112b includes at least two fluid chambers (not shown). Adjustable orifi are disposed between the fluid chambers. The size of each orifice is adjustable to control the resistance of each unit 110a, 110b by controlling the fluid flow rate between the chambers.

The encoder disposed on the main carrousel drive shaft 76 provides signals to a programmable logic controller (not shown). The PLC uses the encoder signals as an indication of the angular position of carrousel 16 to synchronize the motion of carriage 90 with that of the carrousel 16 and the oscillator arm 58. The PLC signals the carriage 90 to extend when a mold 18 is positioned at the article take-out work station 24 and the oscillator arm 58 is extending toward the carrousel 16 in the article-engagement position. The PLC signals the carriage 90 to retract before the oscillator arm 58 begins to swing the engaged blown articles 86 downward and signals the carriage 90 to extend before the expandable pins 84 release the blown articles 86 in the article-release position. The PLC also signals the carriage 90 to retract, once again, before the oscillator arm 58 swings back to the article-engagement position. The programming and operation of the PLC to achieve the desired timing and sequencing of the air cylinders, expandable pins, and other electronically controlled devices is well known to those skilled in the art and will therefore not be elaborated upon here.

The oscillator axis 60 is parallel to and spaced from the carrousel axis (and axle 13) to allow the oscillator arm 58 to swing engaged articles 86 away from the carrousel 16 and to allow the expandable pins 84 to release the blown articles 86 in an upright position onto a tail trimmer mechanism, generally indicated at 116 in FIGS. 4 and 5. The tail trimmer 116 shears off the pinched bottoms of the blow-molded articles 86. In other words, the oscillator arm 58 swings the expandable pins 84 downward away from the carrousel 16 to position blow-molded articles 86 vertically and upright on an underlying tail-trimmer mechanism. The oscillator 64 swings the expandable pins 84 downward from a horizontal position relative to the oscillator axis 60 then propels the expandable pins 84 back toward the molds 18 of the next succeeding mold station on the carrousel 16. The operation and structure of the tail trimmer 116 is described in greater detail in the '217 patent as has been incorporated herein by reference.

The article take-out mechanism 56 also includes an air counter-weight system connected to the oscillator arm 58 to reduce the out-of-balance effect caused by the mass of the oscillator arm 58 and take-out member 82 rotating around the oscillator axis 60. The air counter-weight system includes a second air cylinder, shown at 118 in FIGS. 3–5. The second air cylinder 118 is connected between the support frame 12 and an upper extension 120 fixed to the oscillator arm 58 as is best shown in FIGS. 3 and 4. As the oscillator swings the combined weight of the oscillator arm 58 and take-out member 82 between the article take-out and release positions, an unbalanced centrifugal force results. When the oscillator 64 dwells in the take-out and release positions, an unbalanced torque is applied to the oscillator 64. The second air cylinder 118 is secured to the oscillator arm 58 upper extension and the support frame 12 in a position to offset both the centrifugal force when the arm 58 is in motion and the unbalanced torque when the arm 58 is in a dwell position. In other words, without adding weight to the oscillator arm 58, the air counter-weight system offsets the unbalanced forces created by the combined weight of the oscillator arm 58 and take-out member 82.

In other embodiments of the present invention the oscillator arm 58 may be formed from other materials and in other shapes capable of supporting the take-out member 82 from the oscillator output shaft 68. The number of expandable pins 84 may be either greater or fewer than the four used in the present embodiment, depending on the number of mold cavities within each mold 18 that the take-out member 82 must simultaneously service. Instead of expandable pins 84, other forms of well-known article-grippers may be used to engage and hold blow-molded articles 86. Instead of two pairs of parallel tubular sleeves 92, 94, the article take-out member 82 may include any one of a number of slide configurations commonly known in the art. In addition, any one of a number of different types of pneumatic, electric or hydraulic actuators may be used in place of the first 106 and second 118 air cylinders. Other embodiments may use other types of energy-absorbing units in place of the fluid cylinders 112a, 112b and plunger rods 114a, 114b of the present embodiment. In other embodiments the article-engagement member may release the blow-molded articles in an upright position onto an article conveyor rather than a tail trimmer mechanism.

In practice, a blow-molded article 86 is removed from the carrousel 16 by first rotating the oscillator arm 58 to swing the take-out member 82 inward and upward toward the mold 18. The take-out member 82 is then actuated to move the expandable pins 84 into an extended position away from the oscillator axis 60. The expandable pins 84 are then inserted into the neck openings in the articles 86. Once inside the neck openings the pins 84 are axially compressed to cause the pins 84 to expand radially and engage the inner walls of the article necks.

The mold 18 is then opened, releasing the blow-molded articles 86. The take-out member 82 is then actuated to move the expandable pins 84 into a retracted position toward the oscillator axis 60 and to remove the engaged articles horizontally from between the open halves of the mold 18. The oscillator arm 58 is then actuated to swing the take-out member 82 and the engaged articles 86 downward and away from the carrousel 16 to the article-release position. In the article-release position the articles 86 are suspended vertically upright below the oscillator axis 60 and above the tail trimmer mechanism 116.

The take-out member 82 is then actuated to move the carriage 90 and the expandable pins 84 into their extended positions. The expandable pins 84 are then de-compressed, releasing the articles 86 in a vertical and upright orientation onto the article tail trimmer mechanism 116. Finally, the take-out member 82 is actuated to move the expandable pins 84 into the retracted position.

During each carrousel revolution, the indexer 26 momentarily halts the carrousel 16 in twice as many indexing positions as there are mold stations. As shown in FIG. 2, this additional indexing creates four additional pause positions for each mold station 17 as it travels around the mold station path, i.e., the 1:30, 4:30, 7:30 and 10:30 positions of the mold station path.

The additional pause positions allow additional operations to be carried out on the articles between work stations 22 and 24. This maximizes the portion of the mold station path used for blowing and cooling, yet provides an additional work station for in-mold labeling to be carried out. In other words, additional indexing positions allow additional operations to be carried-out on each mold 18 without inefficiently compressing other blow-molding operations into the early portion of the mold station path.

Therefore, the indexer 26 pauses the four-mold-station carrousel 16 in a total of eight indexing positions per revolution. This causes each of the four mold stations 17 to pause in each of each of eight (12:00, 1:30, 3:00, 4:30, 6:00, 7:30, 9:00 and 10:30) positions around the mold station path, once during each complete 360 degree carrousel rotation.

As shown in FIG; 2, an in-mold labeler 58 is disposed adjacent the carrousel circumference and is adapted to insert a label into each mold 18 when the mold 18 pauses at the 10:30 position of the mold station path. Each mold station 17 pauses at the 10:30 position immediately after it leaves the 9:00 release work station 24 and immediately before it arrives at the 12:00 parison-extrusion work station 22. The in-mold labeler 58 may be of any type known in the art—including the type that affixes the label to the walls of a mold cavity by vacuum suction.

In practice, the carrousel 16 is indexed to sequentially rotate each mold station 17 into a position beneath the extrusion head 48 at the parison-extrusion work station 22 with the mold halves 18a, 18b open. There, the extruder 14 sends molten parison through the extrusion head 48 and extrudes a length of the parison between the mold halves 18a, 18b. The mold halves 18a, 18b then close together around the extruded length of parison, clamping the parison at the mold opening 36 and suspending it in the mold cavity 20. At the 1:30 position, each respective blow pin assembly 28 inserts its blow pin into the molten parison clamped in the mold opening 36, and begins injecting air into the parison. Air is being blown into the molten parison as each mold station 17 rotates between the 3:00 and the 7:30 positions. At the approximate 8:00 position, each blow pin assembly 28 vertically extracts and laterally retracts its blow pin 42. The carrousel 16 then completes its indexing of each mold station 17 into a position adjacent the article take-out work station 24 located at the 9:00 position of the mold station path. There, the mold halves separate and the take-out mechanism 56 removes the article from the mold cavity 20. The carrousel 16 is then indexed to rotate each mold cavity 20 into a position past the release work station 24 and prior to the parison-injection work station 22, i.e. the 10:30 position of the mold station path. There, an in-mold-labeling device 58 inserts a label into the open mold 18. Following label-insertion, the open mold 18 advances back to the parison-extrusion work station 22 at the 12:00 position of the mold station path.

In the illustrated embodiment, blow molding machine 10 includes four mold stations 17, each having four molds 18. As will be appreciated, other embodiments may include more than four, or as few as two mold stations 17. Moreover, each mold station 17 may include more or less than four molds 18, in which case take-out mechanism 56 would be provided with a corresponding number of expandable pins 84. There could also be more than two blow-molding work stations, i.e., more than two external blow molding operations may be carried out on each mold station 17 or article during each carrousel rotation. Other embodiments may also omit the in-mold labeling operation and/or include operations other than in-mold-labeling at the mold station pause positions around the mold station path.

Also, it will be appreciated that the illustrated embodiment provides an automatic take-out mechanism that removes blow molded articles from one or more molds of an indexing-type rotary blow molding machine and places the removed articles in an upright position away from the carrousel.

This is an illustrative description of the invention using words of description rather than of limitation. Obviously, many modifications and variations of this invention are possible in light of the above teachings. Within the scope of the claims one may practice the invention other than as described.

We claim:

1. A method for removing blow-molded articles from a rotary blow-molding machine, the rotary blow-molding machine having a rotary carrousel mounted on a support frame, at least two mold stations supported on the carrousel to rotate along a circular mold station path past a series of work stations including an article take-out work station, each mold station including at least one mold cavity, an indexer operatively connected to the carrousel and adapted to pause the carrousel in twice as many indexing positions as there are mold stations, the indexing positions and work stations angularly spaced so that each mold station pauses in angular alignment with each work station, and an article take-out mechanism mounted adjacent the article take-out work station and comprising an oscillator arm mounted on an oscillator axis adjacent the carrousel, an article-gripper mounted on the oscillator arm, the article-gripper being spaced from the oscillator axis along the oscillator arm; said method including the steps of:

rotating the carrousel so that one of the mold stations is indexed to the article take-out work station;

stopping rotation of the carrousel so that the mold station is held stationary at the article take-out work station;

causing the article-gripper to releasably engage a blow-molded article contained in the or a mold cavity of the mold station at the article take-out work station;

opening the mold cavity containing the engaged article;

removing the engaged article from the mold cavity;

rotating the oscillator arm to pivot the article-gripper and the engaged article downward and away from the carrousel; and releasing the article from the article-gripper in a vertical and upright orientation.

2. A method as defined in claim 1 wherein said step of causing the article-gripper to releasably engage a blow-molded article includes the steps of inserting an expandable pin into a neck opening in the article, and compressing the pin axially to cause the pin to expand radially and engage the inner walls of the article neck.

3. A method as defined in claim 2 wherein said step of releasing the article includes the step of de-compressing the expandable pin and releasing the article in a vertical and upright orientation.

4. A method as defined in claim 1 wherein said step of releasing the article includes the step of releasing the article onto a tail trimmer mechanism.

5. A method as defined in claim 1 further including the step of actuating the take-out member to move the article-gripper into an extended position away from the oscillator axis prior to said step of causing the article-gripper to releasably engage a blow-molded article contained in the mold.

6. A method as defined in claim 1 further including the step of actuating the take-out member to move the article-gripper into a retracted position toward the oscillator axis after said step of moving the article-gripper into engagement with a blow-molded article.

7. A method as defined in claim 5 further including the step of actuating the take-out member to move the article-gripper into the extended position prior to said step of releasing the blow-molded article.

8. A method as defined in claim 6 further including the step of actuating the take-out member to move the article-gripper into the retracted position after said step of releasing the blow-molded article.

9. A method for removing blow-molded articles from indexing-type rotary blow-molding machines using an article take-out mechanism including a support frame, a carrousel supported on the frame for rotation about a central carrousel axis, at least two mold stations supported on the carrousel, each mold station including at least one mold with a mold cavity, at least two work stations disposed adjacent the frame and spaced around the mold station path, one of the work stations being an article take-out work station, an indexer operatively connected to the carrousel, an oscillator arm supported adjacent the carrousel at an oscillator axis, an oscillator operatively connected to the oscillator arm to alternately drive the oscillator arm between an article-engagement position and an article-release position, an article take-out member supported on the oscillator arm, the take-out member having an article-gripper disposed at a point spaced from the oscillator axis, the oscillator axis being spaced from the carrousel axis; said method including the steps of:

rotating the carrousel so that one of the mold stations is indexed to the article take-out work station;

stopping rotation of the carrousel so that the mold station is held stationary at the article take-out work station;

rotating the oscillator arm to swing the take-out member inward and upward toward the or a mold cavity of the mold station at the article take-out work station;

causing the article-gripper to releasably engage a blow-molded article contained in the or a mold cavity at the article take-out work station;

opening the mold cavity containing the engaged article;

rotating the oscillator arm to swing the take-out member and the engaged article outward and downward away from the carrousel to an article-release position where the article is suspended vertically upright below the oscillator axis; and releasing the article from the article-gripper in a vertical and upright orientation.

10. A method as defined in claim 9 wherein said step of causing the article-gripper to releasably engage a blow-molded article includes the steps of inserting an expandable pin into a neck opening in the article, compressing the pin axially to cause the pin to expand radially and engage the inner walls of the article neck.

11. A method as defined in claim 10 wherein said step of releasing the article includes the step of de-compressing the expandable pin and releasing the article in a vertical and upright orientation.

12. A method as defined in claim 9 wherein said step of releasing the article includes the step of releasing the article onto a tail trimmer mechanism.

13. A method as defined in claim 9 further including the step of actuating the take-out member to move the article-gripper into an extended position away from the oscillator axis after said step of rotating the oscillator arm to swing the take-out member inward and upward toward the mold.

14. A method as defined in claim 13 further including the step of actuating the take-out member to move the article-gripper into a retracted position toward the oscillator axis after said step of causing the article-gripper to releasably engage a blow-molded article.

15. A method as defined in claim 9 further including the step of actuating the take-out member to move the article-gripper into the extended position prior to said step of releasing the blow-molded article.

16. A method as defined in claim 15 further including the step of actuating the take-out member to move the article-gripper into the retracted position after said step of releasing the blow-molded article.

* * * * *